US010622810B2

(12) United States Patent
Dushane et al.

(10) Patent No.: US 10,622,810 B2
(45) Date of Patent: Apr. 14, 2020

(54) SYSTEMS, DEVICES AND METHODS OF CONTROLLING LIGHTING AND APPLIANCES ON A CUSTOMER PREMISES BASED ON CONFIGURATION RULES

(71) Applicants: Steven Dushane, Chatsworth, CA (US); Mustafa Oransel, Chatsworth, CA (US)

(72) Inventors: Steven Dushane, Chatsworth, CA (US); Mustafa Oransel, Chatsworth, CA (US)

(73) Assignee: VENSTAR, INC., Chatsworth, CA (US)

( * ) Notice: Subject to any disclaimer, the term of this patent is extended or adjusted under 35 U.S.C. 154(b) by 169 days.

(21) Appl. No.: 14/857,783

(22) Filed: Sep. 17, 2015

(65) Prior Publication Data

US 2016/0134112 A1    May 12, 2016

Related U.S. Application Data

(60) Provisional application No. 62/077,176, filed on Nov. 7, 2014.

(51) Int. Cl.
*H02J 3/00* (2006.01)
*G05B 15/02* (2006.01)
(Continued)

(52) U.S. Cl.
CPC ............ *H02J 3/14* (2013.01); *H02J 13/0079* (2013.01); *H05B 37/0218* (2013.01);
(Continued)

(58) Field of Classification Search
CPC .... H02J 3/14; H02J 13/0079; H02J 2003/146; H05B 37/00; Y04S 20/224; Y04S 20/222; Y02B 70/3225
See application file for complete search history.

(56) References Cited

U.S. PATENT DOCUMENTS 5,962,992 A * 10/1999 Huang ................ H04L 12/2816
315/294
9,137,879 B2 * 9/2015 Rains, Jr. ........... H05B 37/0254
(Continued)

*Primary Examiner* — Charles R Kasenge
(74) *Attorney, Agent, or Firm* — Danner IP Law Firm; Allen D. Danner

(57) ABSTRACT

The pending disclosure describes embodiments of systems, devices and methods of controlling load operations on customer premises based on configuration. Such embodiments include storing output control configuration rules in a memory coupled to a load system controller. Further, such embodiments include receiving configuration instructions from at least one of a remote server and user interface. In addition, such embodiments include configuring the load system into one or more zones based on configuration instructions. Moreover, such embodiments include configuring each zone to be associated with one or more input devices based on configuration instructions. Also, such embodiments include configuring each of the one or more input devices based on configuration instructions. Further, such embodiments include configuring one or more output devices based on configuring the one or more zones, one or more input devices in each zone, the configuration instructions, and the output control configuration rules.

27 Claims, 9 Drawing Sheets

(51) Int. Cl.
 *H02J 3/14* (2006.01)
 *H02J 13/00* (2006.01)
 *H05B 37/02* (2006.01)

(52) U.S. Cl.
 CPC .... *H05B 37/0245* (2013.01); *H02J 2003/146* (2013.01); *Y02B 20/46* (2013.01); *Y02B 70/3225* (2013.01); *Y02B 70/3283* (2013.01); *Y04S 20/222* (2013.01); *Y04S 20/224* (2013.01); *Y04S 20/246* (2013.01)

(56) References Cited

U.S. PATENT DOCUMENTS

| | | | | |
|---|---|---|---|---|
| 9,612,585 B2 * | 4/2017 | Aggarwal | .............. | G05B 15/02 |
| 2007/0273307 A1 * | 11/2007 | Westrick | ............ | H05B 37/0218 |
| | | | | 315/312 |
| 2009/0278479 A1 * | 11/2009 | Platner | ............... | H05B 37/0245 |
| | | | | 315/312 |
| 2014/0001846 A1 * | 1/2014 | Mosebrook | ......... | H04L 12/2816 |
| | | | | 307/11 |
| 2014/0001977 A1 * | 1/2014 | Zacharchuk | ........ | H04L 12/2816 |
| | | | | 315/291 |
| 2014/0035482 A1 * | 2/2014 | Rains, Jr. | ........... | H05B 37/0254 |
| | | | | 315/294 |
| 2014/0055040 A1 * | 2/2014 | Nishigaki | .............. | H05B 37/02 |
| | | | | 315/152 |
| 2014/0354187 A1 * | 12/2014 | Aggarwal | .......... | H05B 37/0245 |
| | | | | 315/312 |

* cited by examiner

SYSTEMS, DEVICES AND METHODS OF CONTROLLING LIGHTING AND APPLIANCES ON A CUSTOMER PREMISES BASED ON CONFIGURATION RULES

CROSS REFERENCE TO RELATED APPLICATION

This application claims the benefit of Provisional Patent Application No. 62/077,176, filed Nov. 7, 2014, the disclosure of which is hereby incorporated herein by reference thereto

TECHNICAL FIELD

The invention relates to apparatus and methods for providing control of environmental equipment remotely.

BACKGROUND

Many companies, large and small, maintain operation of various and multiple types of equipment on their premises in connection with the conduct of their business. The cost of operating this equipment may be significant. Thus, many companies manage the cost of operating this equipment to lower company expenses, thereby increasing profit. Such equipment may include lighting of company facilities as well as different appliances within company facilities. For example, a fast food restaurant may have indoor lights, outdoor lights, an alarm system, cooking appliances, and refrigeration units that are operated and are maintained by electricity.

SUMMARY

However, not all such equipment may need to be operating or even available at all times. Further, there may be a need to alert company personnel of an unexpected appliance shutdown (e.g. refrigeration unit has broken down) or an unexpected startup (e.g. lighting or a cooking appliance turned on after hours).

Current systems that manage the operation of lighting and appliances may be provided to companies by third party manufacturers or distributors. The present invention may be implemented with any type of facilities of the customer, including both business and residential facilities. These exemplary companies are the customers of the third party manufacturers/distributors and the company premises having such lighting and appliance control systems are customer premises. Such lighting and appliance management systems may better meet the needs of companies in managing the cost of operating lighting and appliances for several different reasons. These include configuring a zone with only a limited number of lights (or light-based devices—e.g. signs, etc.) or appliances. A zone is a collection of lights/lighting devices and appliances logically grouped together. Such logical connection may be a function of location in a common area and the nature of the devices (for example lighting) or it may be unrelated to device location (for example, an electric griddle and an illuminated menu sign may be in the same zone because they are both on when a restaurant is operating and both off when the restaurant is no longer offering food service). The lighting devices and the appliances in a zone may be input devices of the zone and configured by the inventive load system controller. Further, the load system controller may be configured with a rigid, predetermined logic that may also be an input to a zone.

A zone output (e.g. whether certain lighting devices and/or appliances should be operating) is determined by the load system controller based on the zone inputs and the rigid, predetermined logic provisioned for the zone. However, many companies that are managing costs of operating lighting devices and appliances on their premises need a more robust, flexible logic and other capabilities for a zone than as compared to the prior art systems, methods, and devices. For example, in accordance with embodiments of the present disclosure, certain dynamically changing operational needs of the company throughout the day and transitory working environment of the company facility throughout the year have been recognized and improved operational characteristics relating thereto are provided.

Further, in accordance with embodiments of the present disclosure, it has been recognized that there is a need for systems, devices and methods of controlling load operations of lighting and appliances on a customer (e.g. company) premise based on configuration rules and new related methodologies. The result is an inventive approach which provides more robust and flexible characteristics as compared to prior art systems, methods, and devices often using certain rigid and predetermined logic approaches.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
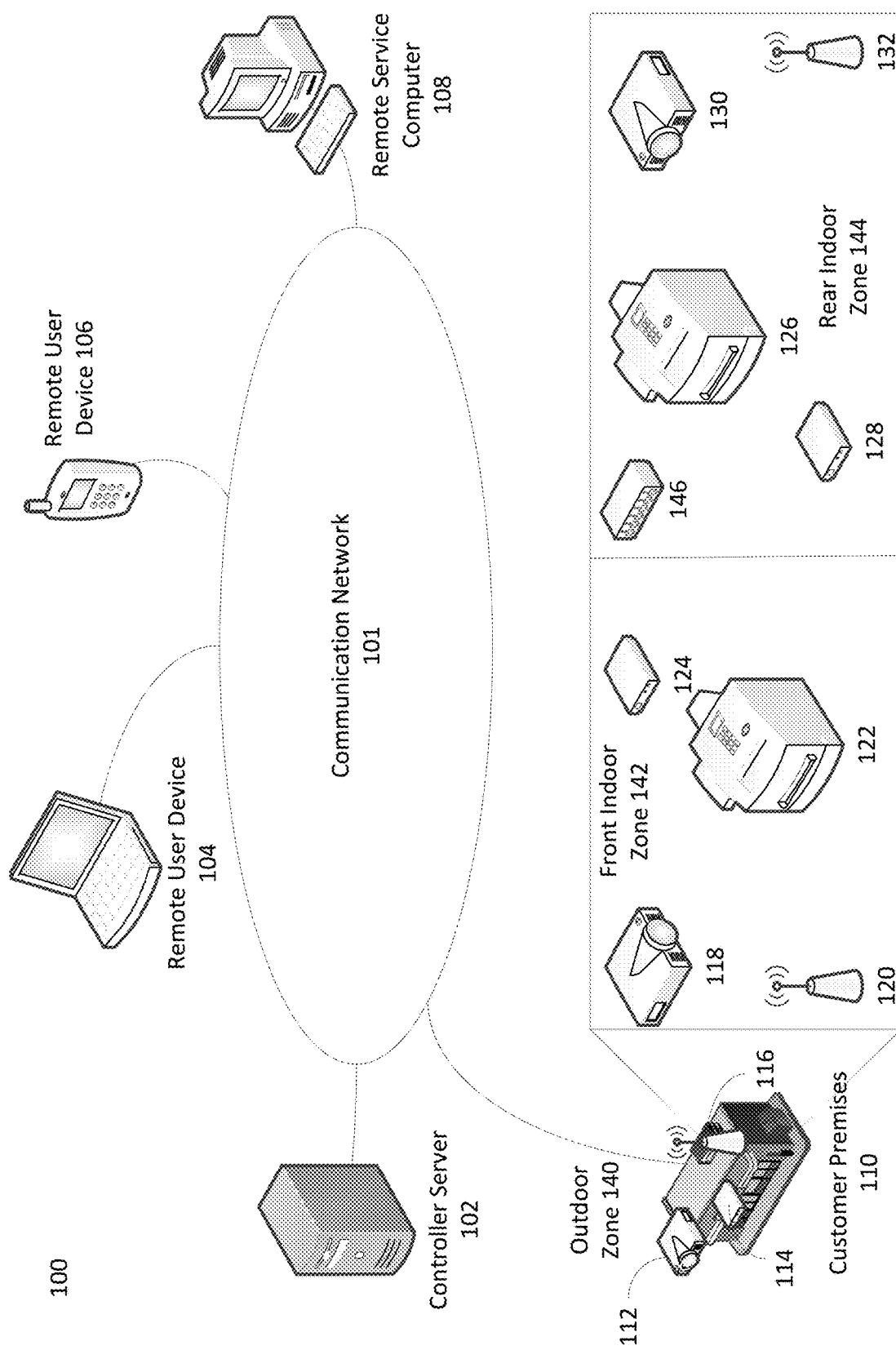
FIG. 1A is a block diagram of a system for controlling load operations on customer premises based on configurations in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the disclosure. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts, and accompanying written description. While these details are helpful to explain one or more embodiments, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

The present disclosure describes embodiments of systems, devices and methods for controlling lighting, appliances and other loads on a customer premise based on configuration rules. Such embodiments include storing a set of output control configuration rules in a memory coupled to a load system controller. Further, such embodiments include receiving, by the load system controller, configuration instructions from at least one of a remote server and user interface. In addition, such embodiments include configuring, by the load system controller, the load system into one or more zones based on configuration instructions.

Moreover, such embodiments include configuring, by the load system controller, each zone to be associated with one or more input devices based on configuration instructions. Also, such embodiments include configuring, by the load system controller, each of the one or more input devices based on configuration instructions. Further, such embodiments include configuring one or more output devices based on configuring the one or more zones, one or more input devices in each zone, the configuration instructions, and the output control configuration rules. Other embodiments include combining and evaluating, output control configuration rules of at least one of alarm setting, manual override setting, demand response control setting, program schedule setting, output device type, and light harvesting setting to determine output state. These embodiments may also include combining and evaluating, output control configuration rules and input devices to determine zone output state such that configuration of the one or more output devices is based on the zone output state. Moreover, the inventive system may be configured to allow the electronic definition of a plurality of loads in a group (which may be completely unrelated to physical proximity) and the implementation of rules on a group specific basis.

FIG. 1A is a block diagram of a system 100 for controlling lighting, appliances and other load operations on customer premises 110 based on configuration rules in accordance with some embodiments of the invention. The present invention may be implemented on a customer premise with lights and appliances, which may be a business location or a residential location. In this particular exemplary embodiment, the customer premises 110 may be a merchant store that has, for example optionally existing, installed lighting and appliance control system(s) from a lighting control manufacturer. The merchant store may be a small business, a national retailer, countrywide fast food chain or any company premises that is a customer to a lighting system manufacturer/distributor. Such a customer premises 110 has a lighting and appliance control system (purchased from and possibly installed by the third party manufacturer/distributor) to manage costs and expenses due to electricity consumption of lighting and appliances on the customer premises 110. The present disclosure discusses, inter alia, aspects of a lighting and appliance control system. The inventive load control system may control lights and appliances (such as cooking equipment, HVAC or other environmental systems, door locks or other security devices etc.) on customer premises 110.

The customer premises 110 may have several different lighting devices and appliances that are managed by the system 100. Such lighting devices and appliances may include a lighting device or lighting system or assembly 112, a contact/switch 114, and a motion sensor 116. the system may include a further lighting device or lighting system or assembly 118, a motion sensor 120, an appliance 122, a contact/switch 124, an appliance 126, a contact/switch 128, a lighting device 130, and a motion sensor 132. Further, system 100 may include a load system controller 146 that includes a main panel. Further, customer premises personnel may configure load system 100 into one or more zones. In accordance with the invention, a zone is a collection of lighting devices and appliances logically grouped together. Moreover, a zone can be configured with a name by store personnel. Thus, referring to FIG. 1A, the lighting devices and appliances (112-132) are configured into three zones, outdoor zone 140, front indoor zone 142, and rear indoor zone 144. Further, outdoor zone 140 is configured to include lighting device 112, contact/switch 114, and motion sensor 116. In addition, front indoor zone 142 is configured to include lighting device 118, motion sensor 120, appliance 122, and contact/switch 124. Also, rear indoor zone 144 includes appliance 126, contact/switch 128, lighting device 130, and motion sensor 132.

In some embodiments, a set of output control configuration rules are stored in memory of a load system controller 146. Further, in a set of embodiments, the store personnel may configure load system controller 146 (thereby configuring the load system) using the main panel. In another set of embodiments, store personnel may configure or may provide configuration instructions to the load system controller 146 using a remote user interface on a remote user device such as laptop computer, desktop computer, tablet computer, smartphone, or any other computing device and/or through a remote computer server. As shown in FIG. 1A, the remote user interface may be on a laptop computer 104 or on a smartphone 106 and there may be a remote controller server that relays such configuration instructions from the remote user device(s) (104-106).

Such configuration of system 100 may include configuring the three zones-outdoor zone 140, front indoor zone 142, and rear indoor zone 144 (including naming the zone). Further, the load system controller 146 may be configured to have each zone to be associated with one or more input devices. An input device is any appliance that is used to determine the operation (or not) of an output device. For example, an input device may be a motion sensor, light sensor, a contact/switch, or a clock/timer. Also, as an example, an output device may be a lighting device or an appliance (stove, refrigeration unit, etc.) as well as a switch. Thus, the input devices for outdoor zone 140 include the contact/switch 114 (may also called a contactor), and motion sensor 116 and the output device may be lighting device 112. Other input devices may be temperature or humidity sensors, and buttons. The input devices for front indoor zone 142 include motion sensor 120 and contact/switch 124 and the output devices are lighting device 118 and appliance 122. The input devices for rear indoor zone 144 include contact/switch 128 and motion sensor 132 while the output devices include appliance 126 and lighting device 130.

In another set of embodiments, configuration instructions provided by store personnel to the load system controller 146 configure each of the input devices of a zone. Further, the load system controller 146 configures the one or more output devices based on one or more zone output states that are in turn determined by the one or more zones, operation (or not) as well as the status of the one or more input devices, the configuration instructions provided by the store personnel, and output control configuration rules. The output control configuration rules may include a priority of different actions/indications of different parts of the load system.

Further, the load system controller 146 includes, is integrated with, or otherwise coupled/connected to a main panel. In some embodiments, the main panel communicates with the load system controller 146 (may also be called a network controller or data concentrator) on a serial communication bus. The main panel may include a (switch logic) matrix module that has one or more inputs and one or more outputs. The matrix module determines zone output states based on the inputs. Further, the main panel is capable of having networked sensors on accessory ports. In addition, the main panel is capable of having a display panel that has LCD and buttons on a display port. Moreover, the main panel is capable of having an expansion board that has extra outputs on the expansion port. Also, the main panel can identify accessories plugged into the accessory ports automatically. Further, main panel may have a dry contact input. An accessory may be any input device or any output device.

In certain embodiments, the main panel may have ten output zones that can be used to operate lighting devices, appliances, and other output devices. Additional embodiments may include the main panel having an expansion port to add more zones. Each zone may be mapped to an output contactor and is configurable as described herein in accordance with the invention, and additionally and optionally as is known in the art. In certain embodiments, a portion of the matrix module is configured for different zones. In some embodiments, there may be, for example, as many as 16 inputs to the matrix module for a zone. In other embodiments, the number of inputs for a zone may be up to sixteen while other embodiments may expand the number of input from sixteen to a number greater than sixteen. In certain embodiments, the main panel may store a setting in main panel memory for each input device or output device for purposes of backup or redundancy. Thus, when an input device or output device is replaced, the replacement device is identified by the main panel and the main panel configures or restores the setting of the replacement device from main panel memory to continue operation of the system 100 with minimal disruption of operation.

An example set of output control configuration rules that may be an input to the matrix module of the main panel, in order of priority, include: Alarm, Manual Override, Demand Response Load Control, Dry Contact, Program Schedule, and Zone Type Rule. Further, zone type rules may include: "Always Off", "Work Lights", "Sales Lights", "Sign Lights", "Miscellaneous Lights", and "Toggle Lights". The matrix module of the main panel enumerates from low to high priority of the inputs to determine the state of each output for a zone. A zone output may correspond to an output device. Further, when an output lighting device is determined to be in an On state, light harvesting rules may be implemented to lower the intensity of or turn off the lighting device if there is enough natural light in the area determined by a light sensor located substantially close or near the output lighting device. If there are any configuration errors, the main panel reports such error to the remote user interface in the remote user device (104-106).

Further, the load system controller 146 is coupled to the remote user devices (104-106) over a communication network 101 (such as the Internet) each having a user interface for managing the load system and load system controller 146. Further, any instructions (e.g. configuration instructions) from the remote user interfaces on the remote user devices (104-106) may be communicated to the load system controller 146 through a controller server 102. The communication network 101 may be any communication network known in the art including a network that implements Transport Control Protocol (TCP)/Internet Protocol (IP) protocols (e.g. an IP network).

In addition, when a part or an aspect of the system 100 is malfunctioning and needs to be repaired or replaced, the load system controller 146 detects such a malfunction and reports the malfunction as a service request for the part (e.g. input device, output device, system and main panel components, etc.). The load system controller 146 may report a malfunction to the display of the main panel or to a remote user interface on a remote user device (104-106). Further, the load system controller 146 may request service or report the malfunction to the controller server 102 which may then determine (based on its prior configuration) to route the service request or malfunction report to a remote service computer 108. Such a remote service computer 108 may then generate a service request or malfunction report to service personnel to repair, replace, or otherwise service the part at issue. Service personnel may be store personnel, personnel from the third party manufacturer/distributor, or some other service personnel.

Figure 1B:
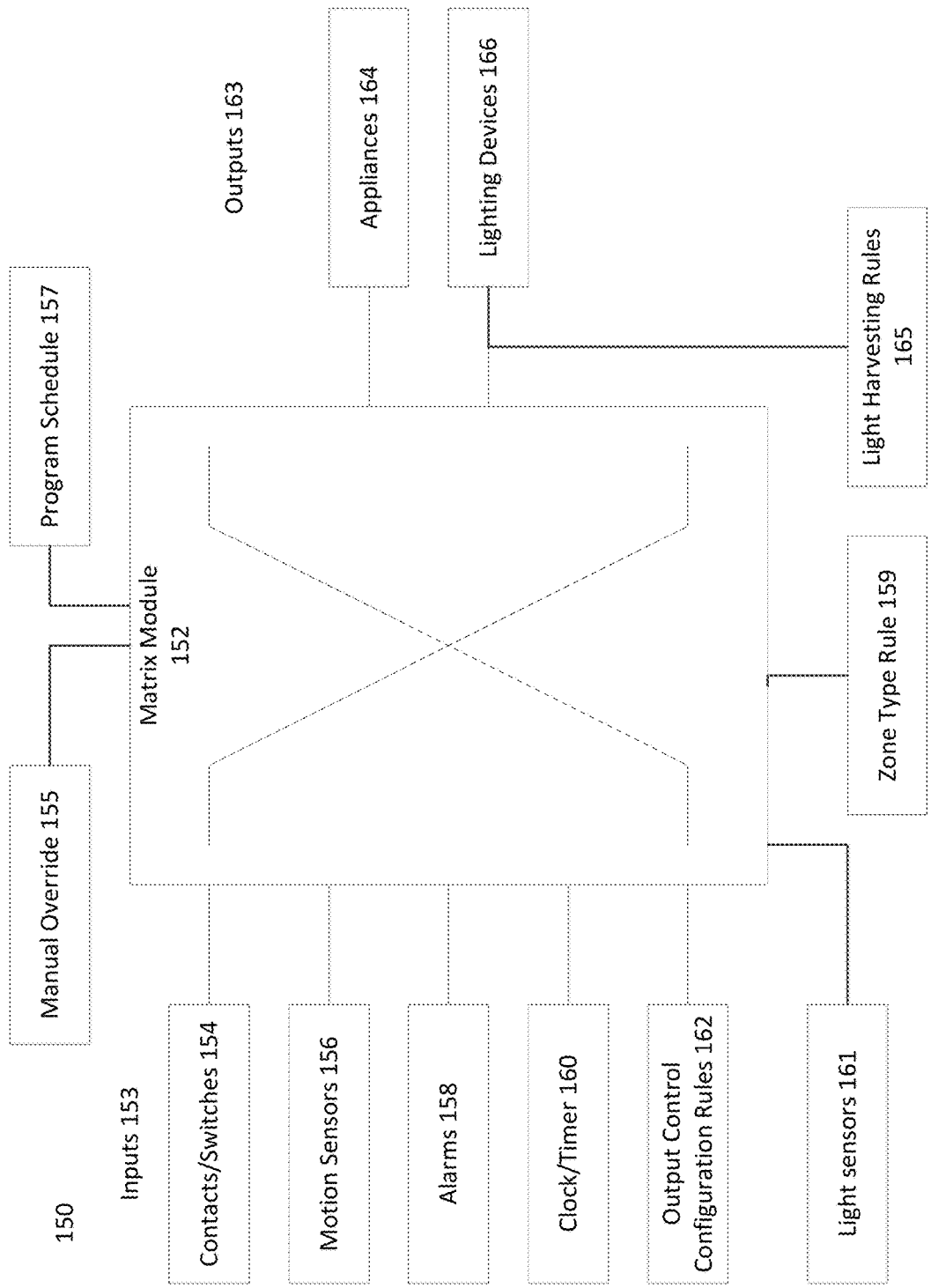
FIG. 1B is a block diagram of a matrix module of a load system controller with inputs and outputs used in controlling load operations on customer premises based on configurations in accordance with some embodiments.

FIG. 1B is a block diagram 150 of a matrix module 152 of a main panel associated with the load system controller with inputs 153 and outputs 163 used in managing the operation of lighting devices and appliances on customer premises based on configuration rules in accordance with some embodiments. The inputs 153 of the matrix module 152 may include, but are not limited to, one or more contacts/switches 154, one or more motion sensors 156, alarms 158, one or more clocks/timers 160, light sensors 161, and output control configuration rules 162 stored in memory of the load system controller. However, additional inputs may include a manual override 155, program schedule 157, and zone type rule 159 stored in the main panel or load system controller. The outputs 163 may include appliances 164 and lighting devices 166. The matrix module 152 may have a zone output state that corresponds to each of the output devices (164-166). However, the zone output state of a lighting device may be further modified based on light harvesting rules stored in the main panel or load system controller.

The output control configuration rules may include a priority of inputs. An example priority may be the following: (1) Alarm; (2) Manual Override; (3) Demand Response Load Control; (4) Dry Contact; (5) Program Schedule; (6) Zone Type Rule (e.g. hard logic). Example zone type rules may include, but not limited to, "Always Off", "Work lights", "Sales lights", "Sign Lights," "Miscellaneous lights," and "Toggle lights." By having the zone type rule have lowest priority, the zone type rule may be the input for the default setting of certain lighting devices 166 and appliances 164 that output devices for the zone. A zone type rule being "Always Off" may be an input to the matrix module 152 such that certain lighting devices 166 and appliances 164 are always not in operation unless other high priority inputs (e.g. program schedule) are provided. Analogously, a zone type rule being "Work lights" may be an input to the matrix module 152 such that certain lighting devices 166 and appliances 164 are always operational, especially those lighting devices used in the work space of the premises unless other high priority inputs (e.g. program schedule) are provided. In addition, a zone type rule being "Sales lights" may be an input to the matrix module 152 such that certain lighting devices 166 and appliances 164 are always operational, especially those lighting devices used in to display products and services on the premises unless other high priority inputs (e.g. program schedule) are provided. Moreover, a zone type rule being "Sign lights" may be an input to the matrix module 152 such that certain lighting devices 166 such as indoor or outdoor signage are always operational on the premises unless other high priority inputs (e.g. program schedule) are provided. Also, a zone type rule being "Miscellaneous lights" may be an input to the matrix module 152 such that certain lighting devices 166 and appliances 164 are always operational, especially those lighting devices used in areas on the premises that may require lighting or appliances in operation for a substantial period of time (e.g. refrigeration unit) unless other high priority inputs (e.g. program schedule) are provided. Further, a zone type rule being "Toggle lights" may be an input to the matrix module 152 such that certain lighting devices 166 and appliances 164 are operational by way of a switch by store personnel.

In one example, a customer premises may be a retail store. The retail store may have operating hours from 9 am to 9 pm every day. Further, store personnel arrive at 8:00 am each day to prepare for each day and leave 10:00 pm each day to clean up after the store closes. Thus, a program schedule configured as part of the output control configuration rules stored into memory coupled to the load system controller for the lighting system for such a retail store may schedule the indoor lights to be turned on at 8 am and turned off at 10 pm. Further, there may be an alarm system scheduled to be turned on at 10 pm. If there is any attempt to enter the building or turn on any indoor lighting device after 10 pm, then an alarm may be triggered. Such an alarm may notify emergency personnel and/or retail store personnel of the unscheduled entrance of the building and/or the turning on of an unscheduled lighting device. At 11 pm, the load system controller may be sent two conflicting instructions, one may be an alarm from the alarm system that indicates an unscheduled indoor lighting device has been turned on and a manual override purported from a trusted retail store personnel to turn off the indoor lighting device. However, due to the priority of the scheme that states that an alarm indication has a higher priority than manual override instructions, the alarm persists and emergency personnel and retail stored personnel are contacted and may be dispatched to the retail store premises. This prevents retail store personnel or people posing as retail store personnel to manually override aspects of the load system.

In another example, the program schedule may have the indoor lights turned on from 8 am to 10 pm. However, a demand response load control may be enacted as part of the priority scheme. Demand response load control configures the load system to change its electric usage from its normal electric consumption patterns to a more conservation oriented electric consumption in response to changes in the price of electricity over time. Also, electric utilities may provide incentive payments designed to induce lower electricity use at times of high wholesale market prices or when system reliability is jeopardized. As a result, the demand response load control may only operate half the indoor lighting devices during the hours of 8 am to 10 pm to conserve electric consumption.

Light harvesting rules 165 allows the load system controller to receive input data such as the natural light intensity detected by indoor and/or outdoor light sensors. Using the received input data, the load system controller determines whether there is sufficient natural light (e.g. sunlight) shining through the windows of the retail store thereby requiring less lighting devices to be in operation or lower the intensity of the light generated by the lighting devices. If it is determined that significant natural light has been detected inside the retail store premises, then the load system controller may only turn on one-third of the indoor lighting devices for a period of time (e.g. 8 am-12 noon). After the expiration of the period time, the load system controller may reassess the amount of natural light streaming into the retail store premises as indicated by the indoor and/or outdoor light sensors. At such a time, for example, the load system controller may configure 60% of the indoor lighting devices for another period of time (e.g. 12 noon to 4 pm). As noted throughout the various embodiments, the load system controllers can take full advantage of the specific functions of the lighting devices, such as dimmers or 3 way lights, for more customized and efficient power allocation. For example, the intensity of the lighting devices may be adjusted according to the examples discussed, such as natural outdoor light or reduced electricity price rates during non-business hours.

Figure 2:
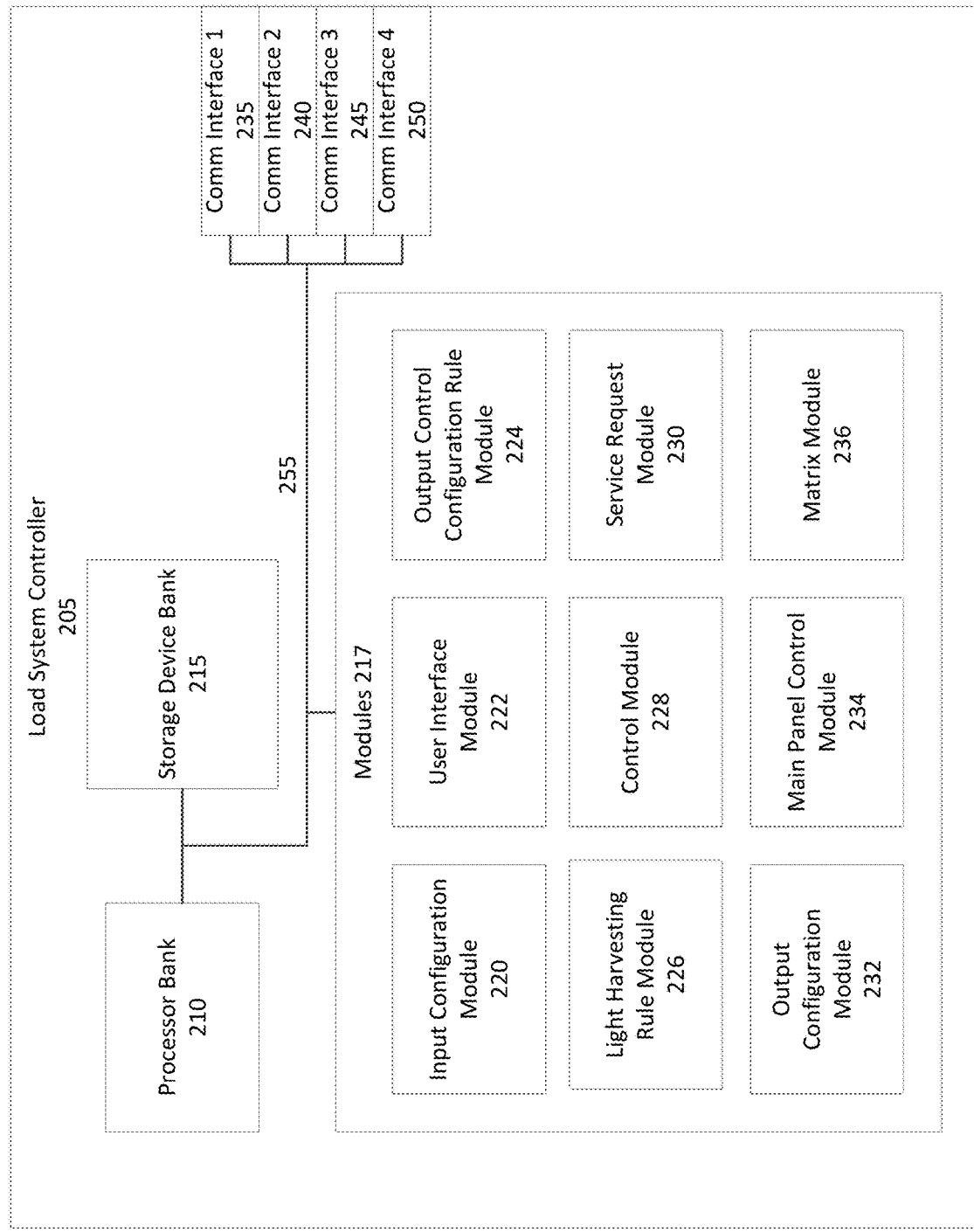
FIG. 2 is a block diagram of a load system controller for controlling load operations on customer premises based on configurations in accordance with some embodiments.

FIG. 2 is a block diagram 200 of a load system controller 205 for controlling load operations on customer premises based on configuration rules in accordance with some embodiments. Such a load system controller 205 may be used in a system shown in FIG. 1. The load system controller 205 may be coupled to a main panel. Further, the load system controller 205 may include several different components such as a processor bank 210, storage device bank 215, one or more software applications, which may be executed by a processor to form specifically-configured module devices 217, and one or more communication interfaces (235, 240, 245, 250). The processor bank 210 may include one or more processors that may be co-located with each other or may be located in different parts of the load system controller 205. The storage device bank 215 may include one or more storage devices. Types of storage devices may include memory devices, electronic memory, optical memory, and removable storage media. The one or more modules 217 may include an input configuration module 220, user interface module 222, output control configuration rule module 224, light harvesting rule module 226, control module 228, service request module 230, output configuration module 232, main panel control module 234, and matrix module 236. The modules 217 may be implemented by the one or more processors in the processor bank 210.

The input configuration module 220 receives inputs, some of which are from various input devices. Further, the input devices may include contacts/switches, motion sensors, alarms, clock/timer, and light sensors. Other inputs may be instructions or commands provided by personnel that include a manual override commands, a program schedule, and zone type rules. All or some of the inputs may be gathered by the input configuration module 220 and provided to the matrix module 236.

The user interface module 222 may implement various functions that include receiving instructions and commands provided by personnel from a remote user interface on a remote user device over a communication network through one or more communication interfaces (235, 240, 245, 250). Further, the user interface module 222 may provide status or send messages regarding some of the input devices, output devices, or other aspects of the load system to the remote user interface on the remote user device (through the one or more communication interfaces (235, 240, 245, 250)). In some embodiments, the user interface module 222 may receive instructions and commands provided by personnel from a main panel coupled to the load system controller 205 through one or more communication interfaces (235, 240, 245, 250). Such instructions may revise or modify output control configuration rules, light harvesting rules, configuration instructions for the input devices, or configuration instructions for configuring output devices (that are inputs to the matrix module 236). In addition, the user interface module 222 may provide status or send messages regarding some of the input devices, output devices, or other aspects of the load system to the main panel.

Output control configuration rule module 224 may store, modify, access and provide a set of output control configuration rules stored in the storage device bank 215 or some other storage or memory device coupled to the load system controller 205. The output control configuration rule module 224 may provide such output control configuration rules as an input to the matrix module 236. An example priority may be the following: (1) Alarm; (2) Manual Override; (3) Demand Response Load Control; (4) Dry Contact; (5) Program Schedule; (6) Zone Type Rule (e.g. hard logic). Example zone type rules may include, but not limited to, "Always Off", "Work lights", "Sales lights", "Sign Lights," "Miscellaneous lights," and "Toggle lights."

The output control configuration rules allow the matrix module to resolve a "collision" of different inputs. For example, an alarm input may dictate to turn on a lighting device inside a retail store premises, however, a program schedule input may dictate that the same lighting device must be turned off because it is after closing time of the retail store. Thus, there is a "collision" of inputs between the alarm and the program schedule that contradict in a current operation of the lighting device. The output control configuration rules may list a priority scheme such that an alarm input takes priority over the program schedule. Thus, the matrix module 236 may turn on the lighting device accordingly.

The light harvesting rule module 226 may store, modify, access and provide a set of light harvesting rules stored in the storage device bank 215 or some other storage or memory device coupled to the load system controller 205. Light harvesting rule module 226 may be coupled to one or more indoor and outdoor light sensors located throughout the retail store premises. Further, the light harvesting rule module 226 may receive input data that includes the intensity of light detected by the indoor and outdoor light sensors. In addition, the light harvesting rule module 226 may determine that the matrix module 236 zone output state corresponding to an output lighting device may be turned on. Moreover, the output lighting device may be located substantially close to one of the indoor and outdoor light sensors. Based on received input data that include the intensity of the light sensor substantially close the lighting device, the light harvesting rule module 226 may decrease or increase the intensity of the output lighting device.

For example, the matrix module 236 may zone output state for an outdoor lighting device to be turned on based on a program schedule dictating that the outdoor lighting device operational at 5 pm. However, due to daylight savings time that starts in the spring, 5 pm is not as dark as when the program schedule was determined. Thus, a light sensor located substantially close or near the outdoor lighting device monitored by the light harvesting rule module 226 may determine the outdoor daylight intensity is such that the outdoor lighting device should not be turned on. In response, light intensity of the outdoor lighting device may be adjusted. Hence, the light harvesting rule module 226 may turn down the intensity of the outdoor lighting device based on the intensity received from the light sensor.

In another example, the light harvesting rule module 226 may receive a signal indicating the intensity detected by the light sensor is low during a particular day (e.g. due to cloud cover of an approaching storm). Pursuant to a program schedule, the matrix module 236 may have the outdoor lighting device turned off during the day. However, the light harvesting rule module 226 may cause the outdoor lighting device to turn on based on the detected low intensity of light determined by the light sensor.

The control module 228 includes software and hardware functions that assist in performing certain tasks for the load system controller 205 such as providing access to a communication link (e.g. wired, wireless, Bluetooth, infra-red, RF, etc.), executing an operating system, managing software drivers for peripheral components, and processing information. In addition, the control module 228 may also include software drivers for peripheral components, user interface computer programs, debugging and troubleshooting software tools. Also, the control module 228 may include an operating system. Such operating systems are known in the art for such a lighting system controller 205 but may also include computer and computing device operating systems (e.g. Android, iOS, Windows Mobile, QNX, Windows, Mac OS, Mac OS X, Linux, Unix, etc.).

The service request module 230 may generate a service request to repair or replace a part of the load system controller by store personnel or by personnel of the third party manufacturer/distributor of the load system. Further, the service request may be generated based on an alarm such that the retail store premises needs examination (e.g. a potential intruder after hours) or assessing various aspects of the load system. Such a service request may be generated automatically by the load system controller 205 based on an alarm, trigger, alert or status notification generated by the load system. Alternatively, the service request may be generated by store personnel monitoring the load system and the load system controller through the main panel or a remote user interface on a remote user device. Such a service request may be sent to the remote user interface on the remote user device, main panel, or a service computer server so as to dispatch personnel to respond to the service request.

The output configuration module 232 receives configuration information such as a zone output state corresponding to an output device from the matrix module 236 to either turn on, turn off, or provide some power to one or more output devices (e.g. appliances and lighting devices, etc.). The light harvest rule module 226 may modify the zone output state and thereby the operation (or lack thereof) of an output device based on the light harvesting rules and the receiving of the light intensity of one or more light sensors.

The main panel control module 234 is coupled to the main panel display and main panel user interface. The main panel control module 234 may be used to display the status of one or more input devices and output devices as well as access other inputs such as the program schedule, output control configuration rules, zone type rules, light harvesting rules, etc. Moreover, the main panel control module 234 may receive instruction from the main panel to modify such inputs or configure input devices. Further, the main panel control module 234 may display alarms, triggers, alerts, and status notifications of various aspects of the load system. In addition, the main panel control module 234 may allow store personnel to generate a service request or display a list of service requests.

The matrix module 236 receives input information from various sources such as input configuration information from the input configuration module 220, output control configuration rule information from the output control configuration rule module 224, configuration instructions from the user interface module 222 and/or the main panel control module 234. Based on such inputs, the matrix module 236 determines a set of output states for one or more zones of the load system. Each zone output state may correspond to an output device. The set of zone output states may be provided to the output configuration module 232, which in turn sets the configuration (e.g. turn on, turn off, configure to some intermediate setting (e.g. intermediate light intensity of a lighting device)) of the output device(s) of the zone(s).

Each of the communication interfaces (235, 240, 245, 250) may be software or hardware associated in communicating to other devices. The communication interfaces (235, 240, 245, 250) may be of different types that include a user interface, USB, Ethernet, WiFi, WiMax, wireless, optical, cellular, Serial, USB, RF Network Connection (Bluetooth, Zigbee, Mesh, etc.), Wired and Wireless IP Network Connection (Ethernet, Wi-Fi, 6lowpan, etc.) or any other communication interface coupled to a communication network. One or more of the communication interfaces (235-250) may be coupled to a user interface known in the art.

An intra-device communication link 255 between the processor bank 210, storage device bank 215, modules 217, and communication interfaces (235, 240, 245, 250) may be one of several types that include a bus or other communication mechanism.

Figure 3:
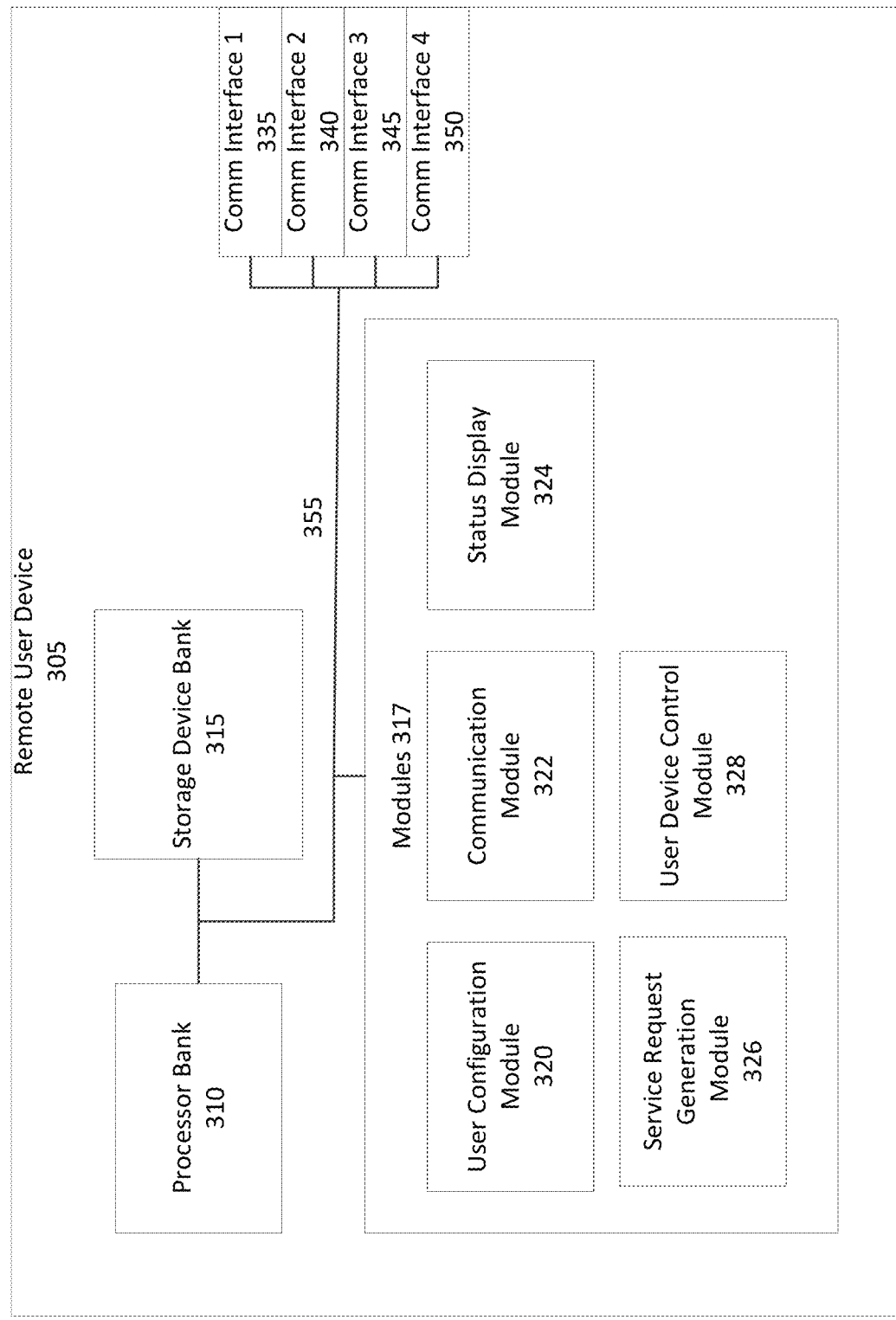
FIG. 3 is a block diagram of a remote user device that is used in a system for controlling load operations on customer premises based on configuration rules in accordance with some embodiments.

FIG. 3 is a block diagram 300 of a remote user device 305 that is used in a system for controlling, for example, lighting and appliances (and/or other load operations) on customer premises based on configuration rules in accordance with some embodiments. Such a remote user device 305 may be used in a system shown in FIG. 1. The remote user device 305 may be a laptop computer, desktop computer, tablet computer, smartphone, or any other computing device. Further, the remote user device 305 may include several different components such as a processor bank 310, storage device bank 315, one or more software applications, which may be executed by a processor to form specifically-configured module devices 317, and one or more communication interfaces (335, 340, 345, 350). The processor bank 310 may include one or more processors that may be co-located with each other or may be located in different parts of the remote user device 305. The storage device bank 315 may include one or more storage devices. Types of storage devices may include memory devices, electronic memory, optical memory, and removable storage media. The one or more modules 317 may include a user configuration module 320, communication module 322, status display module 324, service request generation module 326, and user device control module 328. The modules 317 may be implemented by the one or more processors in the processor bank 310.

The user configuration module 320 receives from configuration instructions from a user, such as store personnel, through a user interface (which can be coupled to the communication interfaces (335, 340, 345, 350)). The configuration instructions may include the operation (or lack of operation) of certain input devices and output devices of the load system as well as, but not limited to, output control configuration rules, program schedule, zone type rules, manual overrides, status request of various aspects of the load system, and light harvesting rules.

The communication module 322 may provide the configuration instructions from the user configuration module 320 to the load system/load system controller over a communication network through the one or more communication interfaces 335, 340, 345, 350. The communication module 322 may use certain standard or proprietary protocols or formats to provide the configuration instructions to the load system/load system controller. Alternatively, the communication module 322 receives status of various aspects of the load system (either from the load system controller or some other part of the light system) including the input devices and output devices. Such status information may be sent using certain standard or proprietary protocols or formats from which the communication module can extract the status information and provide such status information to the status display module 324.

The status display module 324 may receive status information from the communication module 322 and display such status information on a display of the remote user device 305.

The service request generation module 326 generates a service request to be sent to load system controller and/or a remote service computer. The service request may be sent to the load system controller, such that upon a request by store personnel from the main panel, the load system controller can list pending and completed service requests. Further, the service request may be sent to the remote service computer so that service personnel may be dispatched and respond to the service request. Such service personnel may be store personnel, personnel from the third party manufacturer/distributor of the lighting system, or some other service personnel. A service request may be generated upon instructions received by a user in real-time or automatically based on previously stored service generation rules onto the remote user device 305 (e.g. if a bulb goes out for a lighting device, automatically generate a service request).

The user device control module 328 includes software and hardware functions that assist in performing certain tasks for the remote user device 305 such as providing access to a communication link (e.g. wired, wireless, Bluetooth, infrared, RF, etc.), executing an operating system, managing software drivers for peripheral components, and processing information. In addition, the user device control module 328 may also include software drivers for peripheral components, user interface computer programs, debugging and troubleshooting software tools. Also, the user device control module 328 may include an operating system. Such operating systems are known in the art for such a remote user device 305 but may also include computer and computing device operating systems (e.g. Android, iOS, Windows Mobile, QNX, Windows, Mac OS, Mac OS X, Linux, Unix, etc.).

Each of the communication interfaces (335, 340, 345, 350) may be software or hardware associated in communicating to other devices. The communication interfaces (335, 340, 345, 350) may be of different types that include a user interface, USB, Ethernet, WiFi, WiMax, wireless, optical, cellular, Serial, USB, RF Network Connection (Bluetooth, Zigbee, Mesh, etc.), Wired and Wireless IP Network Connection (etc.) or any other communication interface coupled to a communication network. One or more of the communication interfaces (335, 340, 345, 350) may be coupled to a user interface known in the art.

An intra-device communication link 355 between the processor bank 310, storage device bank 315, modules 317, and communication interfaces (335, 340, 345, 350) may be one of several types that include a bus or other communication mechanism.

Figure 4:
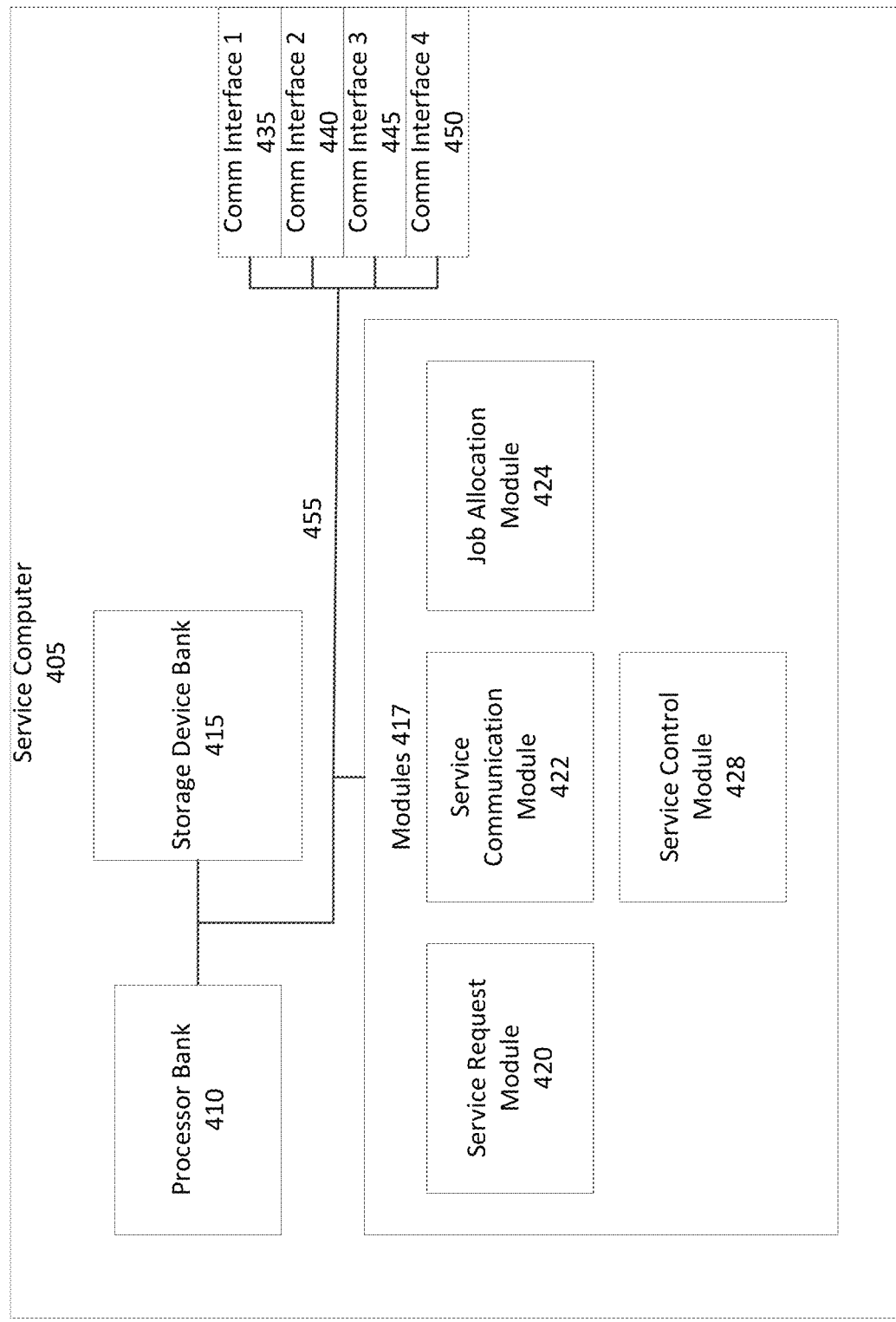
FIG. 4 is a block diagram of a service computer that is used in a system for load system control for controlling load operations on customer premises based on configuration rules in accordance with some embodiments.

FIG. 4 is a block diagram 400 of a service computer 405 that is used in a system for load system controller system for controlling lighting and appliances on customer premises based on configuration rules in accordance with some embodiments. Such a service computer 405 may be used in a system shown in FIG. 1. The service computer 405 may be a laptop computer, desktop computer, tablet computer, smartphone, or any other computing device. Further, the service computer 405 may include several different components such as a processor bank 410, storage device bank 415, one or more software applications, which may be executed by a processor to form specifically-configured module devices 417, and one or more communication interfaces (435, 440, 445, 450). The processor bank 410 may include one or more processors that may be co-located with each other or may be located in different parts of the remote user device 405. The storage device bank 415 may include one or more storage devices. Types of storage devices may include memory devices, electronic memory, optical memory, and removable storage media. The one or more modules 417 may include a service request module 420, a service communication module 422, a job allocation module 424, and a service control module 428. The modules 417 may be implemented by the one or more processors in the processor bank 410.

The service communication module 422 may receive service requests and associated information from a load system or a remote user device. Such service request and associated information may be sent using certain standard or proprietary protocols or formats from which the service communication module 422 can extract and provide to the service request module 420. Further, the service communication module 422 may transmit service job information provided by the job allocation module 424 to a computing device (e.g. smartphone, tablet, laptop, computer, etc.) of personnel (store, manufacturer, distributor, etc.).

The service request module 420 receives service requests from the service communication module 422 and processes the service requests. The processed service requests are provided to the job allocation module 424.

The job allocation module 424 further processes the service requests to determine which type of personnel to forward the service request. For example, if a bulb needs replacement, then the job is allocated to onsite service personnel. However, if a part in the load system controller is damaged, then the job may be sent to manufacturer personnel to be assessed then repaired or replaced.

The service control module 428 includes software and hardware functions that assist in performing certain tasks for the service computer 405 such as providing access to a communication link (e.g. wired, wireless, Bluetooth, infrared, RF, etc.), executing an operating system, managing software drivers for peripheral components, and processing information. In addition, the service control module 428 may also include software drivers for peripheral components, user interface computer programs, debugging and troubleshooting software tools. Also, the service control module 428 may include an operating system. Such operating systems are known in the art for such a service computer 405 but may also include computer and computing device operating systems (e.g. Android, iOS, Windows Mobile, QNX, Windows, Mac OS, Mac OS X, Linux, Unix, etc.).

Each of the communication interfaces (435, 440, 445, 450) may be software or hardware associated in communicating to other devices. The communication interfaces (435, 440, 445, 450) may be of different types that include a user interface, USB, Ethernet, WiFi, WiMax, wireless, optical, cellular, Serial, USB, RF Network Connection (Bluetooth, Zigbee, Mesh, etc.), Wired and Wireless IP Network Connection (Ethernet, Wi-Fi, 6lowpan, etc.) or any other communication interface coupled to a communication network. One or more of the communication interfaces (435, 440, 445, 450) may be coupled to a user interface known in the art.

An intra-device communication link 455 between the processor bank 410, storage device bank 415, modules 417, and communication interfaces (435, 440, 445, 450) may be one of several types that include a bus or other communication mechanism.

Figure 5:
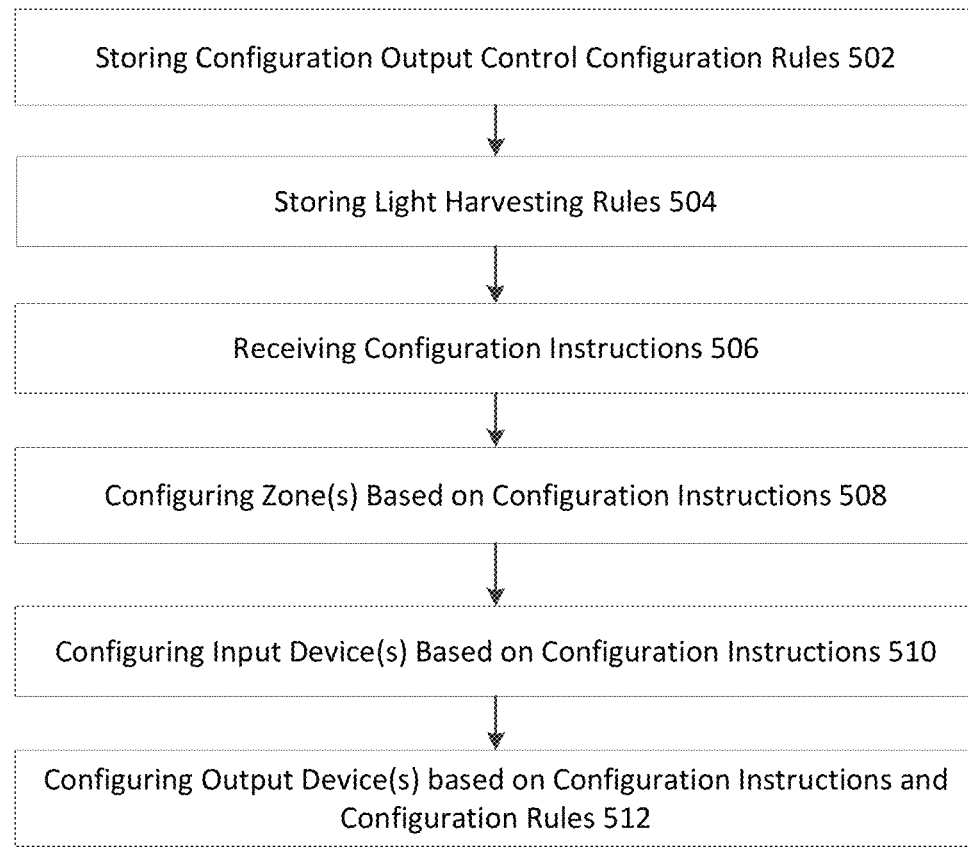
FIGS. 5-8 are flowcharts of methods of controlling load operations on customer premises based on configuration rules in accordance with some embodiments.

FIGS. 5-8 are flowcharts of methods of controlling load operations on customer premises based on configuration rules in accordance with some embodiments. Referring to FIG. 5, method 500 includes storing, by the load system controller, a set of output control configuration rules in a memory coupled to a load system controller, as shown in block 502. Further, the method 500 includes storing, by the load system controller, a set of light harvesting rules in the memory coupled to the load system controller, as shown in block 504. In addition, the method 500 includes receiving, by the load system controller, configuration instructions from at least one of a remote server and user interface on a remote user device, as shown in block 506. Moreover, the method 500 includes configuring, by the load system controller, the load system into one or more zones based on configuration instructions, as shown in block 508. Also, method 500 includes configuring, by the load system controller, each zone to be associated with one or more input devices based on configuration instructions, as shown in block 510. This may include configuring, by the load system controller, each of the one or more input devices based on configuration instructions. Further, method 500 include configuring one or more output devices based on configuring the one or more zones, one or more input devices in each zone, the configuration instructions, and the output control configuration rules, as shown in block 512.

Figure 6:
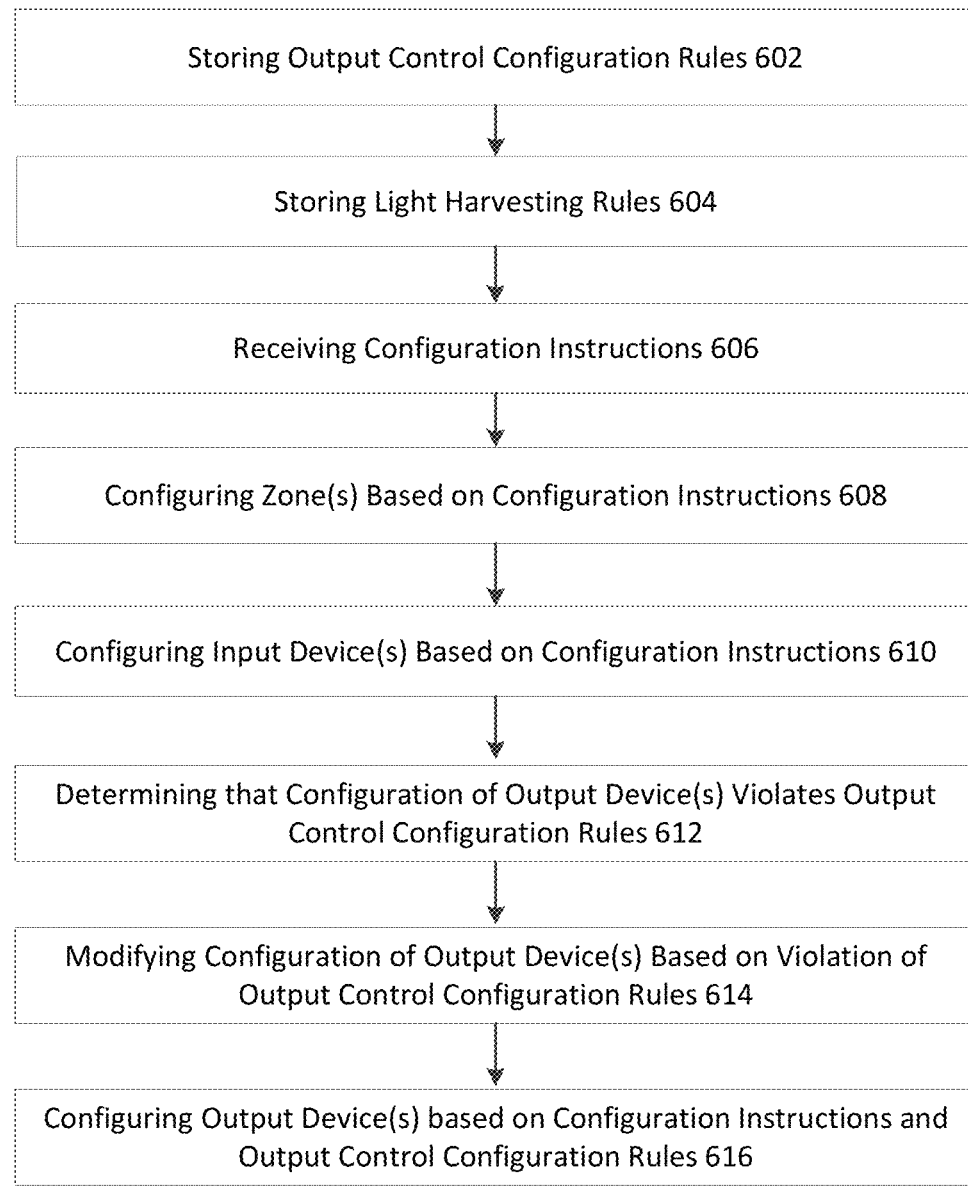

Referring to FIG. 6, the method 600 includes storing, by the load system controller, a set of output control configuration rules in a memory coupled to a load system controller, as shown in block 602. Further, the method 600 includes storing, by the load system controller, a set of light harvesting rules in the memory coupled to the load system controller, as shown in block 604. In addition, the method 600 includes receiving, by the load system controller, configuration instructions from at least one of a remote server and user interface on a remote user device, as shown in block 606. Moreover, the method 600 includes configuring, by the load system controller, the load system into one or more zones based on configuration instructions, as shown in block 608. Also, method 600 includes configuring, by the load system controller, each zone to be associated with one or more input devices based on configuration instructions, as shown in block 610. This may include configuring, by the load system controller, each of the one or more input devices based on configuration instructions. Further, the method 600 includes determining, by the load system controller, that configuration of the one or more output devices violates the output control configuration rules, as shown in block 612. In some embodiments, a matrix module (e.g. as described herein) may determine that certain inputs that violate the output control configuration rules. In addition, method 600 includes modifying, by the load system controller, configuration of the one or more output devices based on violation of the output control configuration rules, as shown in block 614. That is, in some embodiments, the matrix module may provide a zone output state for an output device based on the inputs and the output control configuration rules. Moreover, method 600 include configuring one or more output devices based on configuring the one or more zones, one or more input devices in each zone, the configuration instructions, and the output control configuration rules, as shown in block 616.

Figure 7:
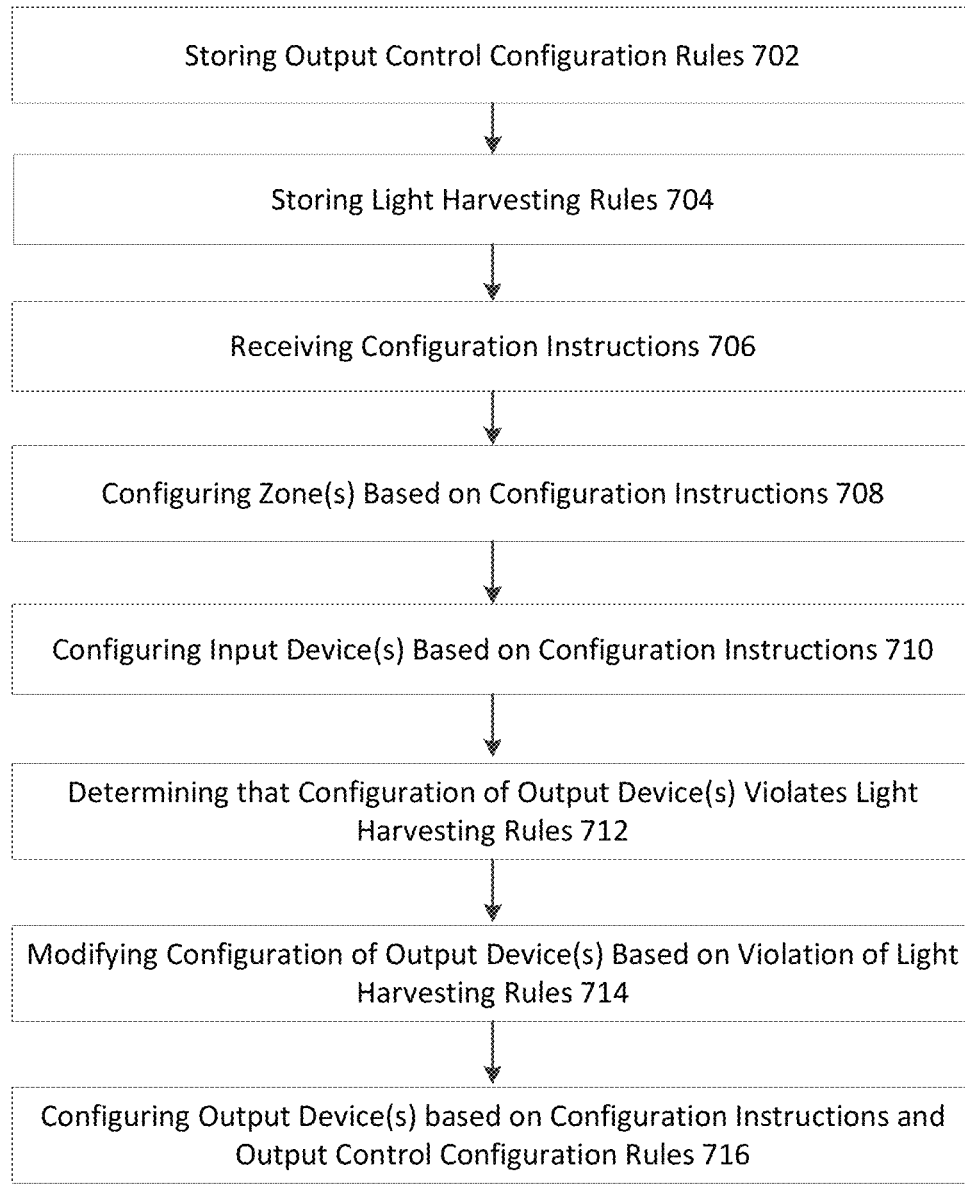

Referring to FIG. 7, the method 700 includes storing, by the load system controller, a set of output control configuration rules in a memory coupled to a load system controller, as shown in block 702. Further, the method 700 includes storing, by the load system controller, a set of light harvesting rules in the memory coupled to the load system controller, as shown in block 704. In addition, the method 700 includes receiving, by the load system controller, configuration instructions from at least one of a remote server and user interface on a remote user device, as shown in block 706. Moreover, the method 700 includes configuring, by the load system controller, the load system into one or more zones based on configuration instructions, as shown in block 708. Also, method 700 includes configuring, by the load system controller, each zone to be associated with one or more input devices based on configuration instructions, as shown in block 710. Further, method 700 include determining, by the load system controller, that configuration of the zone outputs corresponding to one or more output devices violates the light harvesting rules, as shown in block 712. In addition, method 700 include modifying, by the load system controller, configuration of the one or more output devices based on violation of the light harvesting rules, as shown in block 714. Moreover, method 700 include configuring one or more output devices based on configuring the one or more zones, one or more input devices in each zone, the configuration instructions, and the output control configuration rules, as shown in block 716.

Figure 8:
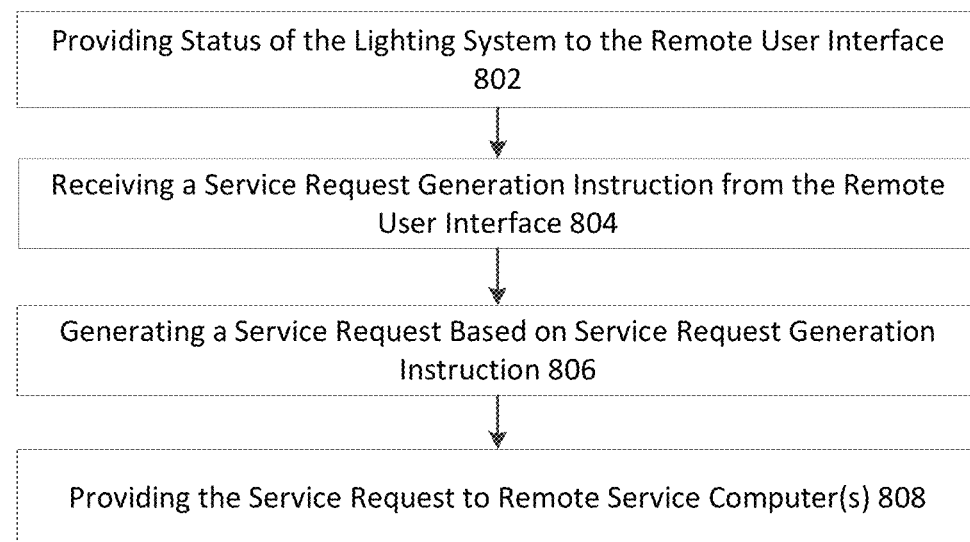

Referring to FIG. 8, the method 800 includes providing, by the load system controller, status of the load system that includes status of the one or more zones, one or more input devices, and one or more output devices to the remote user interface on a remote user device, as shown in block 802. In some embodiments, the user interface may be the main panel. Further, method 800 includes receiving, by the load system controller, a service request generation instruction based on the service request rules stored in at least one of a lighting main panel and in the remote server, as shown in block 804. In addition, the method 800 generating, by the load system controller, a service request based on the service request generation instruction and the status of the load system, as shown in block 806. Moreover, the method 800 includes providing, by the load system controller, the service request to one or more remote service computers, as shown in block 808. The service computers may forward the service request, allocate a job to personnel to respond to the service request, or dispatch personnel to respond to the service request as described herein. In some embodiments, use of a service request function may be restricted based on a configurable security level of personnel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention may be defined by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling a load system comprising:
   (a) storing a set of output control configuration rules in a memory coupled to a load system controller;
   (b) receiving, by the load system controller, configuration instructions from at least one of a remote server and a user interface;
   (c) configuring, by the load system controller, load system output devices into one or more zones based on the configuration instructions;
   (d) configuring, by the load system controller, each zone to be associated with one or more input devices based on configuration instructions, wherein the one or more input devices determines the operation of the output devices, and wherein at least one of the one or more input devices is a sensor;
   (e) configuring, by the load system controller, each of the one or more input devices based on the received configuration instructions, wherein the received configuration instructions modify the operation of the one or more input devices;
   (f) configuring one or more output devices in response to load system output device zone association, one or more input devices, and the output control configuration rules, wherein control of the one or more output devices is dependent on the modified operation of the one or more input devices based on the received configuration instructions;
   (g) providing, by the load system controller, status of the load system that includes status of the one or more zones, one or more input devices, and one or more output devices to the remote user interface;
   (h) receiving, by the load system controller, a service request generation instruction based on service request rules stored in at least one of a load main panel and in the remote server;
   (i) generating, by the load system controller, a service request based on the service request generation instruction and the status of the load system; and
   (j) providing, by the load system controller, the service request to one or more remote service computers.

2. The method of claim 1, wherein the output control configuration rules include priority rules, and further comprising:
   (k) determining an output state of a load system output device based upon the output control configuration priority rules of at least one of alarm setting, manual override setting, demand response control setting, program schedule setting, output type, and light harvesting setting;
   (l) determining a zone output state based upon the output control configuration rules and input devices, wherein configuration of the one or more output devices is based on the zone output state.

3. The method of claim 1, further comprising:
   (k) determining, through the load system controller, that configuration of the one or more output devices violates the output control configuration rules; and
   (l) modifying, by the load system controller, configuration of the one or more output devices based on violation of the output control configuration rules.

4. The method of claim 1, further comprising:
   (k) storing, by the load system controller, a set of light harvesting rules in the memory coupled to the load system controller;
   (l) determining, by the load system controller, that configuration of the one or more output devices violates the light harvesting rules; and
   (m) modifying, by the load system controller, configuration of the one or more output devices based on violation of the light harvesting rules.

5. The method of claim 1 further comprising restricting use of a service request function based on a configurable security level.

6. The method of claim 1 further comprising configuring, by the load system controller, a name to each zone of the one or more zones based on the configuration instructions, said name being displayed on said user interface.

7. The method of claim 1, wherein the one or more input devices is at least one of an indoor light sensor, an outdoor light sensor, a motion sensor, contactor, an alarm, and a button.

8. The method of claim 1, wherein the one or more output devices is at least one of an indoor lighting device, outdoor lighting device, appliance, and a switch.

9. A load system controller of a load system, comprising:
(a) one or more processors;
(b) one or more storage devices coupled to the one or more processors;
(c) a load main panel that includes a display to provide status of one or more input devices and one or more output devices, and a load user interface to receive user instructions; and
(d) one or more modules implemented by the one or more processors, the one or more modules are adapted to:
(i) store a set of output control configuration rules in the one or more storage devices coupled to a load system controller;
(ii) receiving configuration instructions from at least one of a remote server and a user interface;
(iii) configure the load system into one or more zones based on configuration instructions;
(iv) configure each zone to be associated with the one or more input devices based on configuration instructions, wherein the one or more input devices determines the operation of the output devices, and wherein the one or more input devices is one or more of a sensor, a time device, an alarm, a button, and a contactor;
(v) configure each of the one or more input devices based on the received configuration instructions, wherein the received configuration instructions modify the operation of the one or more input devices;
(vi) configure the one or more output devices based on configuring the one or more zones, one or more input devices in each zone, the configuration instructions, and the output control configuration rules, wherein control of the one or more output devices is dependent on the modified operation of the one or more input devices based on the received configuration instructions;
(vii) provide status of the load system that includes status of the one or more zones, one or more input devices, and one or more output devices to the remote user interface;
(viii) receive a service request generation instruction based on the service request rules stored in at least one of a load main panel and in the remote server;
(ix) generate a service request based on the service request generation instruction and the status of the load system; and
(x) provide the service request to one or more remote service computers.

10. The load system controller of claim 9, wherein the one or more modules are further adapted to:
(xi) determine an output state based upon the output control configuration rules of at least one of alarm setting, manual override setting, demand response control setting, program schedule setting, output type, and light harvesting setting;
(xii) determine a zone output state based upon the output control configuration rules and the input devices; and
(xiii) wherein configuration of the one or more output devices is based on the zone output state.

11. The load system controller of claim 9, wherein the one or more modules are further adapted to:
(xi) determine that configuration of the one or more output devices violates the output control configuration rules; and modify configuration of the one or more output devices based on violation of the output control configuration rules.

12. The load system controller of claim 9, wherein the one or more modules are further adapted to:
(xi) store a set of light harvesting rules in the one or more storage devices coupled to the load system controller;
(xii) determine that configuration of the one or more output devices violates the light harvesting rules; and
(xiii) modify configuration of the one or more output devices based on violation of the light harvesting rules.

13. The load system controller of claim 1 further comprising restricting use of a service request function based on a configurable security level.

14. The load system controller of claim 9, wherein the one or more modules are further adapted to configure a name to each zone of the one or more zones based on the configuration instructions.

15. The load system controller of claim 9, wherein the one or more input devices is at least one of an indoor light sensor, an outdoor light sensor, and a motion sensor.

16. The load system controller of claim 7, wherein the one or more output devices is at least one of an indoor lighting device, outdoor lighting device, appliance, and a switch.

17. A load system comprising:
(a) a remote user interface; and
(b) a load system controller having:
(i) one or more processors;
(ii) one or more storage devices coupled to the one or more processors; and
(iii) one or more modules implemented by the one or more processors, the one or more module are adapted to:
(A) store a set of output control configuration rules in the one or more storage devices coupled to the load system controller;
(B) receive configuration instructions from at least one of a remote server and a user interface;
(C) configure the load system into one or more zones based on configuration instructions;
(D) configure each zone to be associated with one or more input devices based on configuration instructions, wherein the one or more input devices comprises one or more of a sensor, a time device, a button, an alarm, and a contactor;
(E) configure each of the one or more input devices based on the received configuration instructions, wherein the received configuration instructions modify the operation of the one or more input devices, wherein the one or more input devices determines the operation of the output devices;
(F) configure one or more output devices based on configuring the one or more zones, one or more input devices in each zone, the configuration instructions, and the configuration collision rules, wherein control of the one or more output devices is dependent on the modified operation of the one or more input devices based on the received configuration instructions;
(G) provide status of the load system that includes status of the one or more zones, one or more input devices, and one or more output devices to the remote user interface;

(H) receive a service request generation instruction based on the service request rules stored in at least one of a load main panel and in the remote server;
(I) generate a service request based on the service request generation instruction and the status of the load system; and
(J) provide the service request to one or more remote service computers.

18. The load system of claim 17, wherein the one or more modules are further adapted to:
(K) determine an output state based upon the output control configuration rules of at least one of alarm setting, manual override setting, demand response control setting, program schedule setting, output type, and light harvesting setting;
(L) determining a zone output state based upon the output control configuration rules and the input devices; and
(M) wherein configuration of the one or more output devices is based on the zone output state.

19. The load system of claim 17, wherein the one or more modules are further adapted to:
(K) determine that configuration of the one or more output devices violates the output control configuration rules; and
(L) modify configuration of the one or more output devices based on violation of the output control configuration rules.

20. The load system of claim 17, wherein the one or more modules are further adapted to:
(K) store a set of light harvesting rules in the one or more storage devices coupled to the load system controller; determine that configuration of the one or more output devices violates the light harvesting rules; and
(L) modify configuration of the one or more output devices based on violation of the light harvesting rules.

21. The load system of claim 17, wherein the one or more modules are further adapted to restrict use of a service request function based on a configurable security level.

22. The load system of claim 17, wherein the remote user interface: receives status of the load system; and provides a service request generation instruction to the load system controller.

23. The load system of claim 17, wherein the one or more remote service computers receive the service request and generate a job request to address the service request.

24. The load system of claim 17, wherein the one or more modules are further adapted to configure a name to each zone of the one or more zones based on the configuration instructions.

25. The load system of claim 17, wherein the one or more input devices is at least one of an indoor light sensor, outdoor light sensor, motion sensor, contactor, and a button.

26. The load system of claim 17, wherein the one or more output devices is at least one of an indoor lighting device, outdoor lighting device, appliance, and a switch.

27. A load system comprising a controller enabling the electronic definition of a plurality of loads in a group for a plurality of groups and the implementation of rules on a group specific basis, wherein the controller controls input devices based on configuration instructions received by the controller to modify the way the input devices operate, where the controller controls an output device in response to received zone association and output configuration rules, wherein the one or more input devices determines the operation of the output devices, and wherein the one or more input devices comprise one or more of a sensor, a time device, a button, an alarm, and a contactor, and wherein the control of the output device depends on the modified operation of the input devices based on the received configuration instructions, and wherein the controller provides status of the load system that includes status of the one or more zones, one or more input devices, and one or more output devices to the remote user interface, and wherein the controller receives a service request generation instruction based on service request rules stored in at least one of a load main panel and in the remote server, and wherein the controller generates a service request based on the service request generation instruction and the status of the load system, and wherein the controller provides service request to one or more remote service computers.

* * * * *